Figure 1:
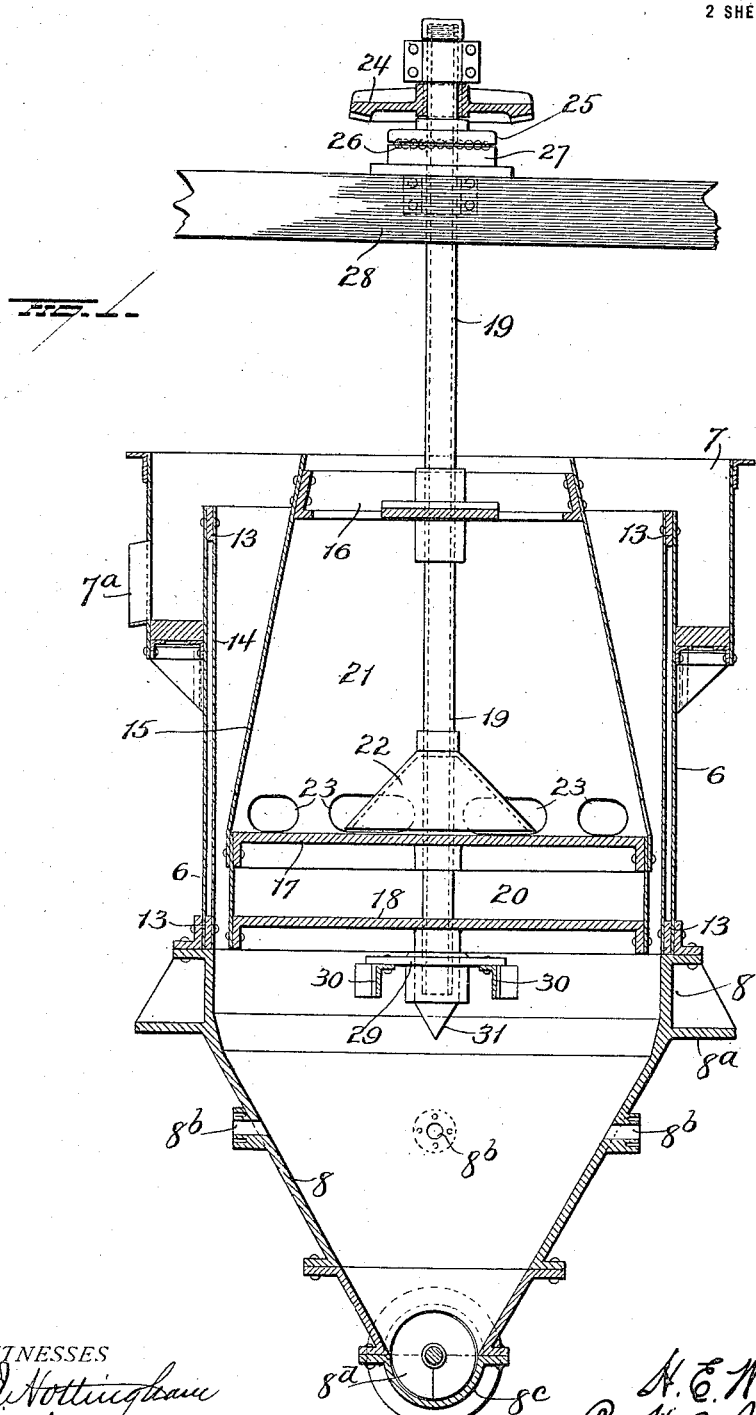

H. E. WETHERBEE.
APPARATUS FOR SEPARATING OR CLASSIFYING ORES.
APPLICATION FILED MAR. 3, 1915.

1,163,876.

Patented Dec. 14, 1915.
2 SHEETS—SHEET 1.

WITNESSES

INVENTOR
H. E. Wetherbee
Attorney

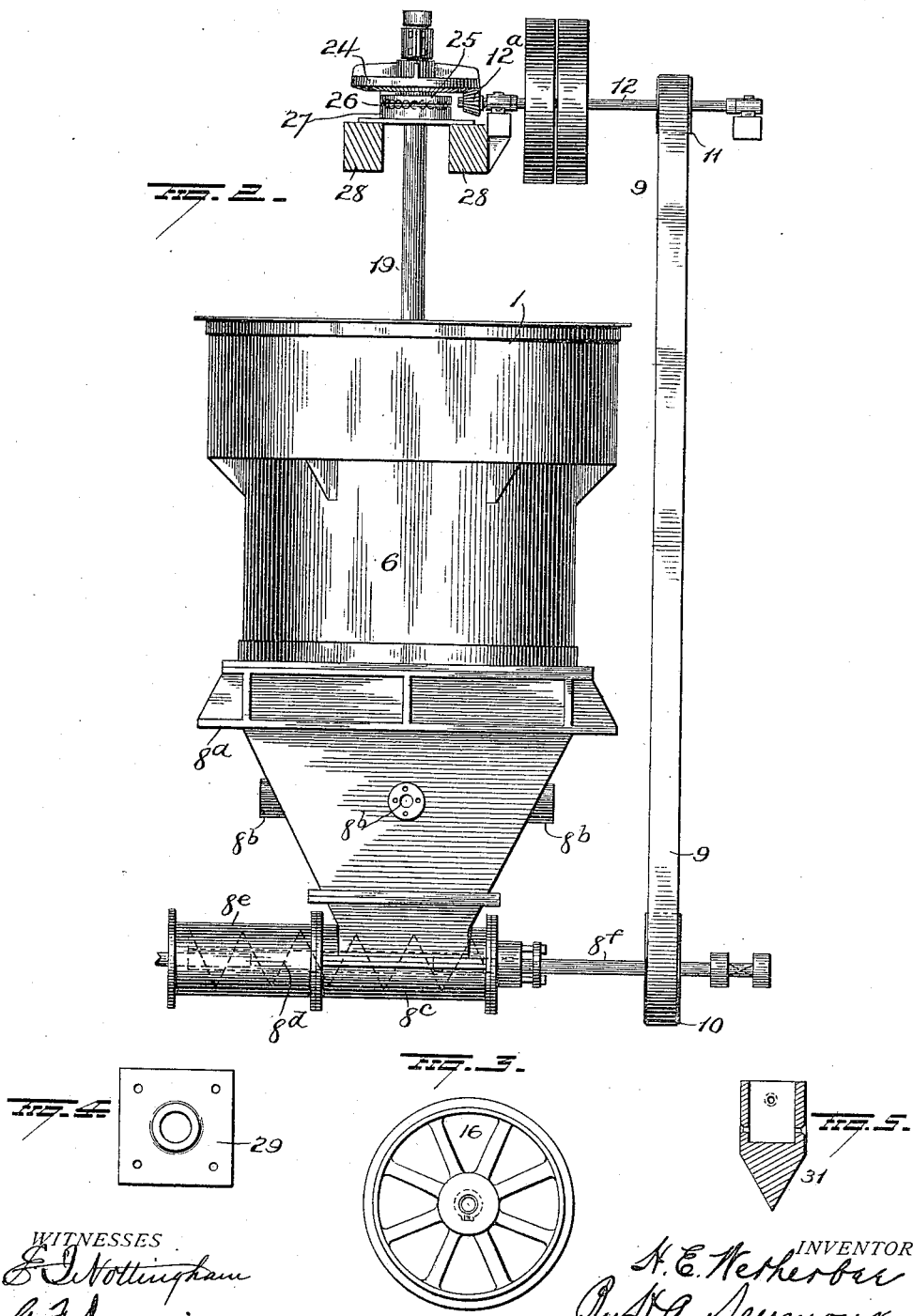

UNITED STATES PATENT OFFICE.

HERBERT E. WETHERBEE, OF CLEVELAND, OHIO, ASSIGNOR TO WETHERBEE CONCENTRATOR COMPANY, OF CLEVELAND, OHIO.

APPARATUS FOR SEPARATING OR CLASSIFYING ORES.

1,163,876.

Specification of Letters Patent. Patented Dec. 14, 1915.

Application filed March 3, 1915. Serial No. 11,733.

*To all whom it may concern:*

Be it known that I, HERBERT E. WETHERBEE, a citizen of the United States, and a resident of Cleveland, in the county of Cuyahoga and State of Ohio, have invented certain new and useful Improvements in Apparatus for Separating or Classifying Ores; and I do hereby declare the following to be a full, clear, and exact description of the invention, such as will enable others skilled in the art to which it appertains to make and use the same.

My invention relates to improvements in means for separating or classifying ores and is an improvement on the apparatus disclosed in Patent Numbers 856,611 and 856,612 granted to me June 11th, 1907, the present improvement being designed to cheapen the cost of construction, operation and maintenance of said device.

My invention consists in a device for subjecting comminuted mineral and gangue material to the sorting action of water under conditions that are capable of positive and exact control, and thus produce marketable minerals from ores that in their original condition could not be profitably worked.

In the accompanying drawings, Figure 1 is a view in vertical section of my improved device; Fig. 2 is a view in elevation of the same; Fig. 3 is a view of the top support of the drum; Fig. 4 is a view of the lower bearing for the drum shaft, and Fig. 5 is a view of the ferrule for the lower end of said shaft.

6 represents a stationary cylindrical receptacle, surrounded at the top by a circular launder 7, having an outlet $7^a$. The receptacle 6 is rigidly secured to the cast-iron base or substructure 8, which is provided with flanges $8^a$ adapted to rest on a frame (not shown) which carries or supports the apparatus. This base 8, is hopper shape as shown, and is provided with one or more, preferably a series, of water inlet openings $8^b$, and at its bottom with means for the discharge of the material that settles in the base of the machine. This discharging means consists of a trough $8^c$, which constitutes the bottom of the base, a screw conveyer $8^d$, located within said trough, and a casing or pipe $8^e$ firmly bolted to the base and to the trough, and at its outer end to the boot of an elevator (not shown). The screw conveyer $8^d$ extends into the casing or pipe $8^e$, and is secured to a shaft $8^f$ which is driven by a belt 9, mounted on the pulleys 10 and 11, the latter being on shaft 12 which is driven from any suitable source of power.

The housing of the elevator to which the pipe or casing $8^e$ is connected, is water tight and extends upwardly above the level of the water in the apparatus, so that there will be the same hydrostatic pressure in the elevator housing and the apparatus, and consequently no downward flow of water through the elevator housing into the base of the machine.

Located within the receptacle 6 are the wood rings 13 which form supports for the cylindrical steel lining 14, which is secured to the receptacle 6 by suitable bolts or other fastening means. Located within the receptacle and concentric with it is the revolving drum, which consists of the castings 16, 17 and 18, all of which are rigidly secured to the shaft 19, and each is provided with a flange to which the drum casing 15 is secured, the said flanges being lathe turned so that the casing 15 will run accurately and concentrically within the receptacle. Castings 17 and 18 are solid heads or diaphragms, while casting 16, which is located at the top, is of skeleton or spider form so as to permit of the free entrance of the material to be treated. The two heads or diaphragms 17, 18 are located at the lower end of the drum, and divide the latter into two compartments, the lower one 20 of which is air tight, and is so designed as to render the drum so buoyant that it nearly floats when the apparatus is full of water, and an upper compartment 21 which receives the material which is to be separated or classified.

Secured to the shaft 19 within the upper compartment 21, and near the bottom thereof, is the conical deflector 22, and the shell 15 of said drum is provided in a plane just above the diaphragm 17, with a series of openings 23 through which the material discharged into the drum escapes into the receptacle 6. The shaft 19 to which the drum is secured, is provided at its upper end with a bevel gear wheel 24, and immediately below the same with a bearing plate 25, having a raceway therein for the balls 26 which are carried in a raceway in bearing 27 secured to the supporting frame 28. The shaft 19 and drum carried thereby, are hung or suspended from the bearing 27, and the shaft is steadied and prevented from any lateral movement by the plate 29, which latter is supported on arms 30 secured within casting 8 below diaphragm 18 and is provided with an opening surrounded by a flange. This plate 29 is not supposed to sustain or carry any of the weight of the shaft and drum, but simply operates to steady the same and hold the drum concentrically within the receptacle. The lower end of the shaft is provided with a pointed ferrule 31, which operates to guide the shaft into the opening in the plate in assembling the parts. The bevel gear wheel 24 at the upper end of shaft 19, is in mesh with the smaller bevel wheel 12$^a$ on driving shaft 12, which as previously explained drives the conveyer 8$^d$ by means of the belt 9.

In the operation of the apparatus mineral and gangue material which has been previously disintegrated and screened or otherwise treated to remove particles that are too coarse for treatment in the machine, are introduced into the top of the revolving drum. This material becomes very fluid, as the drum is kept full of water. The ore and gangue particles fall to the surface of the diaphragm 17, and are thrown out by centrifugal force through the openings 23 in the shell 15 of the drum, into the space between the revolving drum and the wall of the receptacle. There they meet a slowly rising current of water admitted through the supply openings 8$^b$, which water is also rapidly whirling, due to the rotary motion of the drum. The particles are projected across the annular space between the drum and the wall of the receptacle, and travel in helical paths either upward or downward and against the inner face of the lining 14. By this movement the ore particles receive a scouring action that detaches the sand particles from the ore, both of which are then simultaneously subjected to the sorting action of the upwardly moving stream of water. The centrifugal action and velocity of the rising current of water are under independent control, and by changing or modifying such centrifugal action and velocity, different products can be produced that settle and are discharged by the conveyer 8$^d$, and a lighter product that overflows with the water into the launder 7.

An example of the use to which the apparatus is particularly useful is in treating sandy Mesabi iron ores. These ores consist of comparatively coarse particles of iron oxid, mixed with very fine particles of silica, and in their natural condition are not marketable. By treatment in this apparatus, under proper method of operation, the particles of iron oxid fall to the bottom and form a merchantable product and are removed by the conveyer and elevator, while the finer silicious material is carried up by the upward current of water and is discharged as waste. In treating this material, the ore as received from the mine is first screened to remove the coarser lumps, and the finer material is then treated, in one or more of the apparatus as described to eliminate the finer silicious material.

The drum may be formed with the upper part of it tapered as shown, or under other conditions of operation it may be of the same diameter throughout its length. The object in tapering it, is to provide for proper operation when considerable water is fed to the apparatus with the material to be treated. This water passes through the holes 23 in the drum and rises between the drum and the lining 14 and overflows into the launder, and by gradually increasing the space between the drum and the receptacle, or in other words gradually increasing the area of the sorting column of water, the upward velocity of the water is retarded in this part of the apparatus, so that it will have substantially the same upward velocity as the water in the apparatus below the discharge openings 23 in the drum. Unless considerable water is introduced with the material to be treated, the sides of the drum may be straight or nearly so. As the air space 20 in the drum renders the same nearly buoyant, but little weight is borne by the bearings of shaft 19, and by providing that part of the receptacle which receives the wear with a removable lining, it becomes an easy and simple matter to quickly replace this lining whenever it becomes necessary.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. In an apparatus for separating or classifying ores, the combination of a stationary hydraulic classifying receptacle open at its top and having discharge means adjacent its lower end, a hollow drum within said receptacle, the said drum being open at its top and provided with discharge openings in its side wall near its bottom, and a shaft to which the drum is secured, the said shaft being supported at its upper end and passing centrally through the drum, and means below the drum and engaging the shaft for sustaining the latter against lateral movement.

2. In an apparatus for separating or classifying ores, the combination of a stationary hydraulic-classifying receptacle open at its upper end and having discharge means adjacent its lower end, a launder fixed to and surrounding the upper open end of said receptacle, a hollow drum within the receptacle, the said drum being open at its upper end and provided in its side wall adjacent its lower closed end with discharge openings, a removable lining for that part of the receptacle in the plane of the drum and means for rotating the drum.

3. In an apparatus for separating or classifying ores, the combination of a stationary hydraulic-classifying receptacle open at its top and having a discharge opening adjacent its bottom, a buoyant drum within said receptacle, the said drum being open at its top and having discharge opening adjacent its bottom, means supporting the drum within the stationary receptacle and means for rotating the drum.

4. In an apparatus for separating or classifying ores, the combination of a stationary hydraulic-classifying receptacle, a launder fixed to and surrounding the upper end of said receptacle, a buoyant drum within said receptacle, the said drum being tapering as shown and open at its top and provided with discharge openings in its sides and means for rotating the drum.

5. In apparatus for separating or classifying ores, the combination of a stationary hydraulic-classifying receptacle open at its top, a launder surrounding the open upper end of said receptacle, a buoyant drum having an open top and discharge openings adjacent its bottom, means supporting said drum within the receptacle, a removable lining secured to and within the receptacle in the plane of the discharge openings in the drum, and means for rotating the drum.

6. In apparatus for separating or classifying ores, the combination of a receptacle open at its top and having a hopper shaped base member and a cylindrical body portion, an open top rotating buoyant drum within the cylindrical portion of the receptacle, the said drum having discharge openings in its side wall, and means at the bottom of the hopper shaped base member for removing the material at the bottom of the receptacle.

7. In apparatus for separating or classifying ores, the combination of a receptacle, a buoyant drum within the receptacle, the said drum being composed of a shell, two imperforate diaphragms near its lower end, and a skeleton frame or spider at its upper end, the said drum being open at its upper end and provided with discharge openings in its side wall, a shaft carrying said drum and mounted in bearings above and below the drum and means for rotating the shaft.

8. In an apparatus for separating or classifying ores, the combination of a receptacle open at its top and having a hopper shaped lower end, a screw conveyer at the bottom of same, a removable lining for the upper part of said receptacle, a shaft located centrally within the receptacle, and suspended from antifriction bearing, means for holding the lower end of said shaft against lateral movement and a drum on said shaft, the said drum being open at the top and provided with discharge openings at the side.

9. In apparatus for separating or classifying ores, the combination of a stationary hydraulic classifying receptacle, having discharge means at its bottom, a shaft within said receptacle and suspended from an antifriction bearing above the receptacle, means for holding the lower end of said shaft against lateral movement, and a drum secured on said shaft, the said drum having an open top through which the material is fed to the apparatus and openings in its side through which said material is discharged into the receptacle during the rotation of the drum.

In testimony whereof, I have signed this specification in the presence of two subscribing witnesses.

HERBERT E. WETHERBEE.

Witnesses:
  R. F. GRANT,
  SAM. W. FOLSOM

Copies of this patent may be obtained for five cents each, by addressing the "Commissioner of Patents, Washington, D. C."